United States Patent [19]

Bradbury et al.

[11] Patent Number: 4,694,405

[45] Date of Patent: Sep. 15, 1987

[54] LASER PRINTER CONTROLLER DATA ALIGNMENT DEVICE

[75] Inventors: Colin Bradbury; George H. Douglas, both of San Diego, Calif.

[73] Assignee: Office Automation Systems, Inc., San Diego, Calif.

[21] Appl. No.: 753,669

[22] Filed: Jul. 9, 1985

[51] Int. Cl.[4] .............................................. G01D 15/06
[52] U.S. Cl. ..................................... 364/518; 346/154
[58] Field of Search ................ 364/518, 519; 346/154, 346/159, 107, 108; 400/119; 358/300

[56] References Cited

U.S. PATENT DOCUMENTS

| 4,435,723 | 3/1986 | Seimiya et al. | 346/154 |
| 4,438,232 | 8/1985 | Koyama | 364/518 |

Primary Examiner—Arthur G. Evans
Attorney, Agent, or Firm—Brown, Martin, Haller & Meador

[57] ABSTRACT

The laser printer controller for accepting a page of data to be printed in ASCII character format converts the data into a dot-by-dot character pattern for packing in a vertically scrolling partial page bit map. The alignment device within the laser printer controller provides the means for effectively aligning the randomly positioned dot-by-dot character patterns having a first word orientation with respect to its storage boundaries with a second word orientation necessitated by the fixed word storage boundaries of the partial page bit map. The alignment device includes means for partitioning two adjacent words in their first word orientation of the character pattern for alignment with the second word orientation of the page bit map, packing the two respective portions of the adjacent words into a one word format, rotating or manipulating the two word portions within the one word format for proper bit sequence for a single print data word of the second word orientation. The alignment device also includes means for saving the generated print data word in the page bit map by inclusively ORing the data word to be stored into the page bit map with the data that is currently in the page bit map whereby to prevent partial character loss for overstrike characters. The page bit map of the laser printer controller includes scrolling means which provides for the output of one dot line of data to be printed to be interleaved with the loading of the data into the page bit map. As the top, or current dot line is moved from the page bit map for transfer to the print engine, that line of the page bit map is cleared and moved, by appropriate pointers to the bottom of the partial page bit map and there made available to receive newly generated print data words.

16 Claims, 10 Drawing Figures

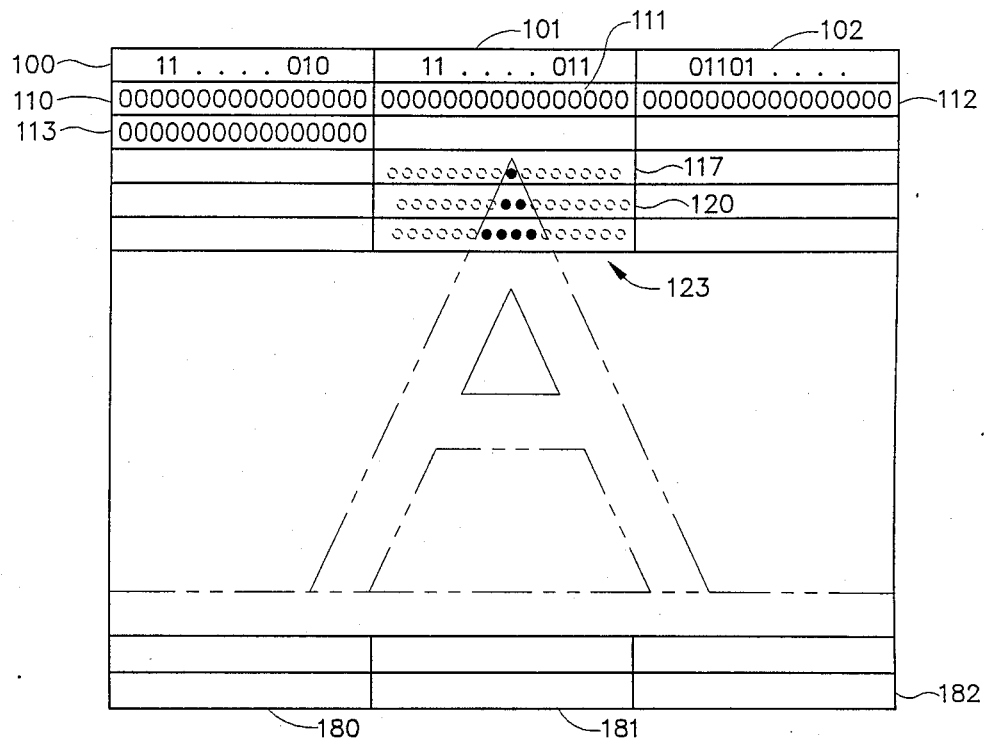
FIG. 2a
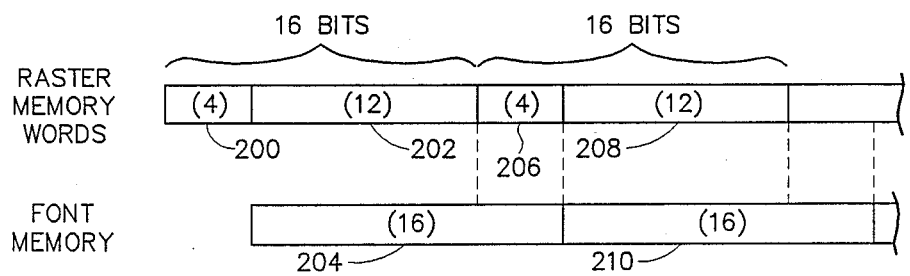
FIG. 2b
FIG. 3

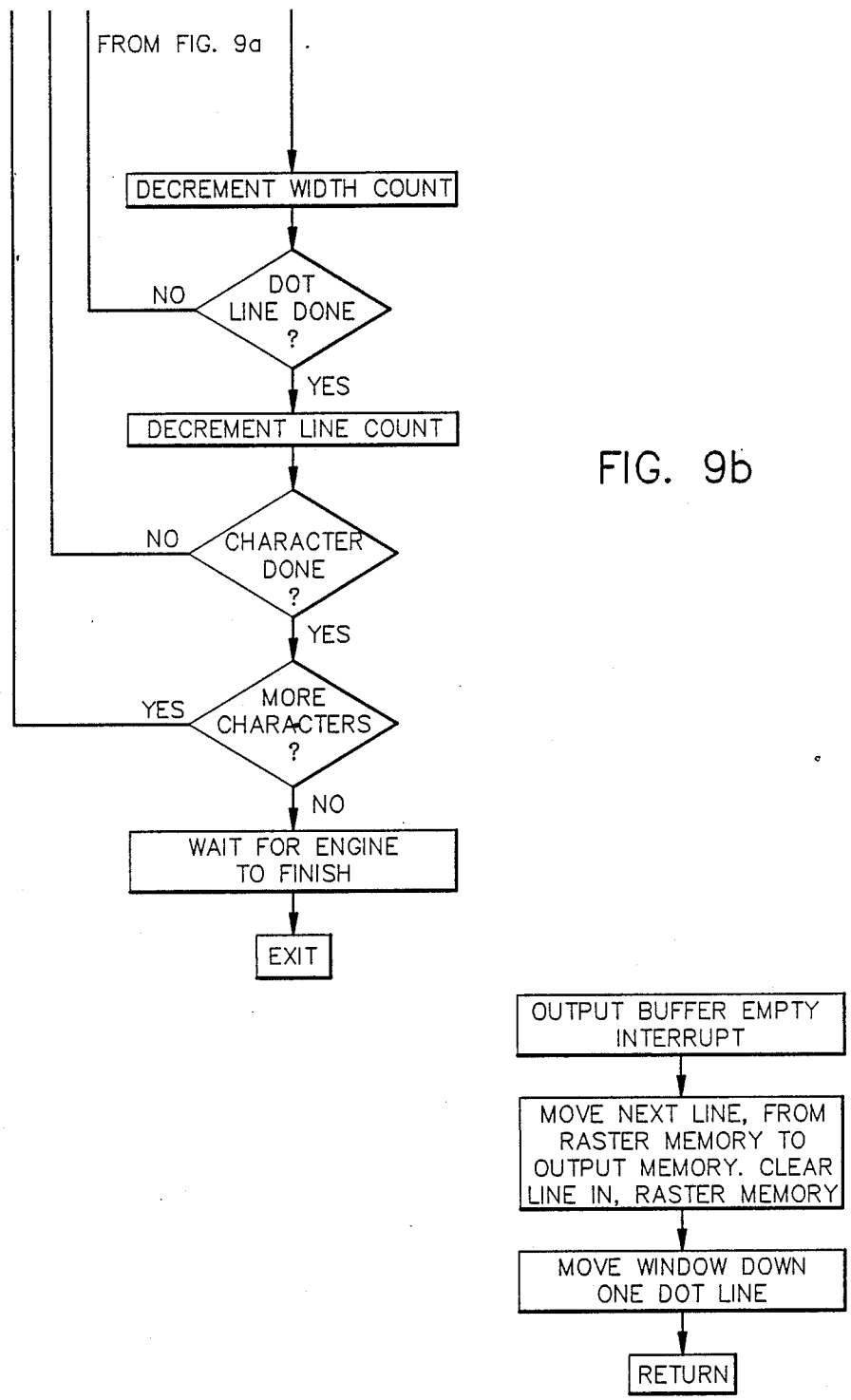

LASER PRINTER CONTROLLER DATA ALIGNMENT DEVICE

BACKGROUND OF THE INVENTION

The present invention relates to a laser printer controller and more particularly to an alignment device within the controller which sequentially accepts the word by word first word orientation dot-by-dot character pattern for alignment or mapping into a second word orientation having fixed word storage boundaries of a page bit map in a raster memory.

Conventional laser printer engines require data in the form of a bit stream where each bit represents a dot on the ultimately printed page. The data rates required by the printer engines are very high as the laser print engines provide extremely high resolutions and operating speeds. The print engines typically use a video type interface similar to that required by a conventional TV set. This interface requires a burst of data as the laser beam moves across the page with each data bit corresponding to dots on the printed page. The print engine is inactive during periods when the laser beam moves back to the start position for the next line (retrace). A longer inactive period is provided as the beam moves back to the start position and to the top of the next page. The print engine provides timing signals to indicate the start and end of data transfer periods and also the start and end of print pages.

A typical line of data for 8½ inch wide paper consists of 2650 dots. A typical 11 inch long piece of paper consists of 3300 dot lines or a total of over 8.5 million dots or bits of data for a printed 8½ × 11 page. Because a typical laser printer can print a page approximately every 4 seconds, the laser printer is an enormous consumer of data and the problems inherent in manipulating and preparing the data for use by the laser engine is staggering.

The laser printer controller of this invention provides a system which efficiently and effectively manipulates this volume of data and which provides the necessary throughput in a time frame which is consistent with the laser printer engine.

The data manipulation task of a typical controller requires the conversion from a page repesentation of ASCII characters and their locations into a page bit map where each dot location on the bit map is represented by one data bit. To generate the page bit map, the characters must be converted from their ASCII representations into a dot-by-dot character pattern, then the character pattern stored in the page bit map at the precise locations which correspond to the character positions. The dot-by-dot character pattern of a typical ASCII character requires an average 30 by 30 dot pattern. Using a 16 bit word, the dot-by-dot character pattern requires an array of data words, three words wide and thirty words high. Specifics with regard to a particular character may change but these averages are generally accurate. Each character is described as having a fixed dot-by-dot character pattern and is associated with a defined base line and lead line from which its position on the printed page and its position relative to adjacent characters is determined.

Because the character locations are generally randomly placed the storage word boundaries of the dot-by-dot character patterns generally do not correspond with the fixed word stage boundaries of the page bit map in the raster memory. Accordingly, the first word orientations of the storage words for the dot-by-dot character patterns must be aligned and repacked into the second word orientation which accommodates the horizontal offset between the respective first word orientations and second word orientations for storage into the raster memory for the page bit map.

Conventional techniques for packing the character patterns into page maps require two storage operations for each word within the character pattern. Conventionally, the most significant bit positions of the first word in the character pattern are loaded into the least significant bit positions of the corresponding word on the page bit map. Next, the least significant bit positions of the first word of the character pattern are stored within the most significant bit positions of the next word within the page bit map. The number of bits moved is determined by the offset between the first word orientation and the second word orientation. Data not written into the page bit map by that portion of the character pattern which is moved to the page bit map, that portion of the word in the page bit map which is not to be overwritten, is typically preserved by disabling the corresponding write enable circuitry during the write operation for the specified memory locations. The above process is repeated until the entire dot-by-dot character pattern has been moved into the page map.

Accordingly, it is easy to see that this technique always requires two data storage cycles into the memory of the page map for each word within the character pattern and is therefore very time consuming and costly for a laser printer controller which must provide a very high data throughput rate.

SUMMARY OF THE INVENTION

The present invention relates to a laser printer controller in which randomly positioned ASCII characters having fixed dot-by-dot character patterns may be efficiently stored in the memory for a page map having fixed word storage boundaries.

The laser printer controller of the present invention includes a controller responsive to a controller program for monitoring and generating control signals and for manipulating and storing data in response to the control signals, the controller program and the user. An interface to the host system is provided from which data is received, in the form of ASCII characters, in a display list which includes the ASCII representations of the character and their positions.

A font memory is provided which stores the dot-by-dot character patterns of each ASCII character in a first word orientation having fixed word boundaries relative to the character pattern. A raster memory is provided for a partial page bit map having fixed word storage boundaries in a second word orientation for the bit by bit representation of the page to be printed. The architecture of the raster memory includes scrolling means that allows a dot line to be moved out of the raster memory for transmit to the print engine and that dot line cleared and moved to the bottom of the partial page map, by appropriate pointers, and there made available to accept new print data. Output memory and output logic are provided to take a dot line of data from the raster memory and transmit it serially to the print engine. Data rates and output drivers are provided by the output logic but the print engine provides timing signals to indicate the start and end of the transfer period. The controller interprets the end of transfer status signal from the print engine and moves the next dot line of data from the raster memory into the output memory.

An alignment device is connected between the controller and the raster memory to provide a hardware element that aligns the randomly positioned dot-by-dot character patterns having storage word boundaries of a first word orientation with the second word orientation of the fixed word bounaries of the page bit map in the raster memory. The alignment device inlcudes a first word latching elements to save the bit representation of the prior dot-by-dot character pattern data word in its first orientation. If the current (see below) word is the first word of a line of the dot-by-dot character pattern, then all zeros are stored within the first latch. The contents of the first latch are presented to the first side of a dual input 16 bit transfer element having respective inputs for each bit of the transfer element. The transfer element is sometimes referred to as a storage element as its outputs are held for the duration of its input upon enabling. The current data word of the character pattern is presented to the other input of the dual input transfer or storage element. If the prior word is the last word of a line of the dot-by-dot character pattern, then all zeros are presented to the other input. An offset value is determined by the controller means which represents the number of bits that the dot-by-dot character pattern must be right shifted to align its bit pattern with the second word orientation of the page map. The offset value enables the loading into the storage element of the most significant bits from the first latch or old data word which corresponds to the offset value and enables the least significant bits of the current word or new data word into the correspondingly least significant bit position of the storage element. After loading of these partial bit elements of two adjacent words in the first word orientation of the dot-by-dot character pattern into the storage element, the least significant data positions of the storage element maintain the least significant data bits of the current or old data word and the most significant positions maintain the most significant data bits of the prior or new data word. For proper alignment, these data bit portions must be rotated so that the data bit portions of the prior data word precede or are maintained in the least significant data positions.

The alignment device includes rotating means whereby the data portions are rotated such that all bits are in proper sequence for a single print data word in the second word orientation. The offset value defines the bit blocks of data which are transposed from the least significant bit positions to the most significant bit positions and vice versa. Upon completion of the rotate operation, the print data word is now properly aligned with proper bit sequence for storage in the fixed second word orientation with proper word boundaries of the page bit map in the raster memory.

The alignment device includes further means for using the print data word as the write enables for storage into the raster memory whereby the write enables are only activated if the print data word contains a one (1). In this fashion, zeros are not written into memory. This technique enables the alignment unit to inclusively OR data into the raster memory and thereby prevent the overriding of data.

The operation is repeated for all words within the dot-by-dot character pattern.

Using this structure, the alignment device of the laser printer controller of this invention stores only one word of each access of a word from the dot-by-dot character pattern. Accordingly, substantial time savings are provided upon the storing of the aligned print data word into the page bit map of the raster memory.

In response to the controller program and the control lines the controller enables and disables the transfer of data between the elements of the system and the transfer data between the alignment device and the raster memory. The controller unit also includes means for determining the offset value and the location for storage of the print data word into the raster memory.

In view of the above, it is a primary objective of the present invention, to provide a laser printer controller which generates and continuously updates a partial page map representation.

Still another object of the present invention is to provide a system which stores print data words without destroying the prior content of the page bit map.

Still another object of the present invention is to provide a laser printer controller device which can generate data for a print engine using a partial page bit map raster memory.

It is still another object of the present invention to provide for the asynchronous transfer of data to the print engine and the loading of the dot-by-dot character pattern into the page bit map.

Still another object of the present invention is to provide a system which can efficiently align a first word orientation of a character pattern with a second word orientation of a page bit map.

It is still another object of the present invention to provide a partial page bit map which is continually transferred to the print engine and new data which is being continually updated into the page bit map such that the partial page bit map scrolls down the page of material to be printed.

BRIEF DESCRIPTION OF THE DRAWINGS

The objects, advantages and features of the present invention will be more fully apparent from the detailed desription set forth below, taken in conjunction with the accompanying drawings in which like reference characters correspond throughout and wherein:

FIG. 2a is a graphical representation of an exemplary dot pattern-bit map of a font memory;

FIG. 2b is a chart illustrating the corresponding dot pattern configuration to a bit pattern configuration;

FIG. 3 is a comparison of the word boundaries as input and output from the alignment unit;

Table A: Program equations for programmable array logic-coarse rotation (001)

Table B: Program equations for programmable array logic-fine rotation (002)

Table C: Program equations for programmable array logic-cut and paste bits 12-15 (003)

Table D: Program equations for programmable array logic-cut and paste bits 8-11 (004)

Table E: Program equations for programmable array logic-cut and paste bits 4-7 (005)

Table F: Program equations for programmable array logic-cut and paste bits 0-3 (006)

Table G: Program equations for programmable array logic-write enable (008)

DETAILED DESCRIPTION OF THE PREFERRED EMBODIMENTS

Figure 1:
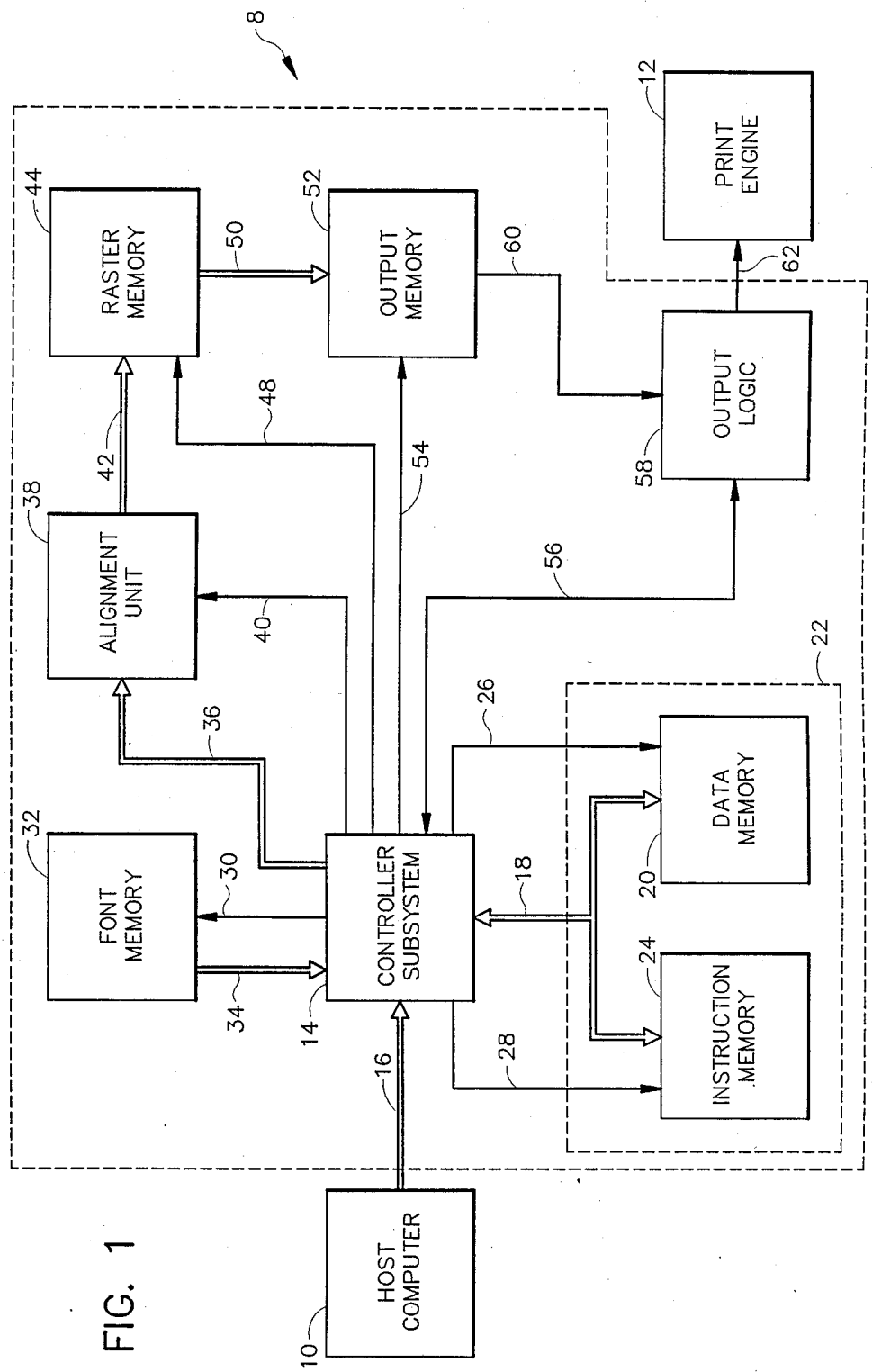
FIG. 1 is a schematical block diagram of the laser printer controller of the present invention.

FIG. 1 illustrates in schematical block diagram form, the laser printer controller 8 coupled between a host computer 10 and a print engine 12. The controller 8 includes a controller subsystem 14 which received from host computer 10 on bus 16 data in the form of ASCII characters. The controller subsystem which includes a microprocessor under program control transfers the data received from the host computer on bus 18 into the data memory portion 20 of control memory 22. The data stored in data memory portion 20 is stored as a "display list". The display list contains the position of each character on the page, i.e., X and Y coordinates, and the ASCII representation of the character. Controller subsystem 14 is also coupled by bus 18 to an instruction memory 24 within control memory 22. Controller subsystem 14 respective provides on lines 26 and 28 control signals for the accessing of data memory portion 20 and instruction memory portion 24. Instruction memory portion 24 holds instructions for microprocessor of controller subsystem 14 and the configuration parameters selected by the user which permit the controller subsystem to interface with various designs of data formats provided by the host computer. For example, the configuration parameters permit the controller to emulate a Diablo printer, an Epson printer, or an RS-232 input. In alternative configurations, the interface to the host computer 10 may be generally any serial or parallel interface structure. Such control parameters are well-known in the art and such interface devices are also well known.

Controller subsystem 14 provides control signals on line 30 to a font memory 32 which has stored therein a dot-by-dot character pattern (character bit-map) corresponding to each distinct character. Although the ASCII representation of a character may be typically stored in one or two bytes, the bit-map representation may typically occupy hundreds of bytes. When accessing a particular character bit-map, the access bits from font memory 32 are provided to controller subsystem 14 on bus 34. The data provided on bus 34 from font memory 32 typicaly includes character parameters, such as words per bit line in the character bit map, character bit line height within the total character height, dot width within the character bit map and dot height above the character bit map base line. Following the parameters of the character bit map in sequential order are the words whose bits represents corresponding dots or absence of dots which forms the character.

The data words received from font memory 32 are transferred through controller subsystem 14 on bus 36 to alignment device or unit 38. Alignment unit 38 receives control signals from controller subsystem 14 on line 40 for controlling and manipulating of data provided from the controller subsystem. Alignment unit 38 receives the words from controller subsystem 14 which are typically 16 bits long. The dot-by-dot character pattern data contained within each word from the font memory has a particular first orientation with respect to the word boundaries, i.e. 16 bit word length. However a different alignment or second orientation is generally necessary for the data within the page bit map of the raster memory. Alignment unit 38 redefines the word boundaries by reformating adjacent words in a first orientation of an input word stream such that the output words in a second orientation contain essentially the same data in an entire bit stream with different word boundaries. Alignment unit 38 provides on bus 42 the reformated words to raster memory 44. Alignment unit 38 also provides control signals on line 46 which controls the writing of the words in predetermined memory locations within raster memory 44. Controller subsystem 14 also provides on line 48 a control signal to raster memory 44 which controls its operation. Raster memory 44 comprises a plurality of individual random access memories, each corresponding to a bit position within the reformated words of the second orientation. Each bit of a reformated word in the second orientation is stored in a predetermined memory location in the corresponding random access memories of the raster memory. When a following reformated word is received, the word is stored in the next memory location.

Raster memory 44 provides the output words on bus 50 to output memory 52. Raster memory 44 is typically of a size sufficient to hold a small "window" of the entire bit map printed page. The dot-by-dot character pattern is moved into the raster memory 44 only when the "window" completely covers that part of the page where the character is to be printed.

The controller subsystem moves the top dot line of data in the window from the raster memory 44 to the output memory 52 during a beam-retrace period. The portion of the raster memory 44 used to hold this data is cleared then cycled to the bottom of the window and the window effectively moves one dot line down the page.

During a transmit data-transfer period, controller subsystem 14 provides control signals on line 56 and 54 respectively to output logic 58 and output memory 52 which transfers data serially from output memory 52 to output logic 58. This data is coupled through output logic 58 on line 62 to print engine 12.

FIG. 2a illustrates a typical dot-by-dot character pattern for the letter "A". As the controller subsystem accesses a particular character pattern in the font memory, the font memory responds with the character bit map preceded by a preamble which contains character environmental information relating to the pattern such as word 100 followed by other informational words such as the height of the character, the width of the character within the dot pattern and the relationship of the letter above the base line 125 in the dot pattern. After the microprocessor has received the character pattern preamble information, it begins receiving sequentially words, in this example bit words, sequentially across the character pattern and then going down a row and across this next row. In this example, the microprocessor would read word 110 sequentially followed by words 111, 112, 113 through word 182. Words 110-113 are represented by the logical bit state with all bits being 0 corresponding to not dot being placed within the word dot pattern which the word represents for that area of the dot pattern.

Words 117,120 and 123 are illustrated in FIG. 2a in their dot pattern configuration. The notation for word 123 is illustrated in the note attached as FIG. 2b with respect to the conversion between the corresponding dot pattern and the bit pattern. In FIG. 2b, the bit pattern for the areas in which dots are not present are indicated by a logical 0 while the areas in which the dots are present are indicated in the bit pattern by a logical 1.

FIG. 3 illustrates the reformating or alignment of the bits provided to the alignment unit from the first orientation of the font memory via the controller subsystem. Typically an alignment offset is required in printing a character upon a page. For example as illustrated in FIG. 3 four zeros corresponding to an offset of 4 dot positions are inserted before the beginning of the data from the character pattern's first orientation word 204. These 4 bits indicated at partial word porton 200 are coupled with the first 12 bits as bit portion 202 which corresponded to the first 12 bits of the 16 bit word received from the character pattern first orientation from font memory as word 204. Word portions 200 and 202 form a complete 16 bit word which is stored in the raster memory. Upon completion of storing, bit portions 200 and 202 from the first word in the second word orientation in the raster memory, the alignment unit cooperates with the raster memory to store the last 4 bits of the old word as bit portion 206 with the next 12 bits of the next word as bit portion 208 from the following 16 bit word 210 from the font memory.

Figure 4:
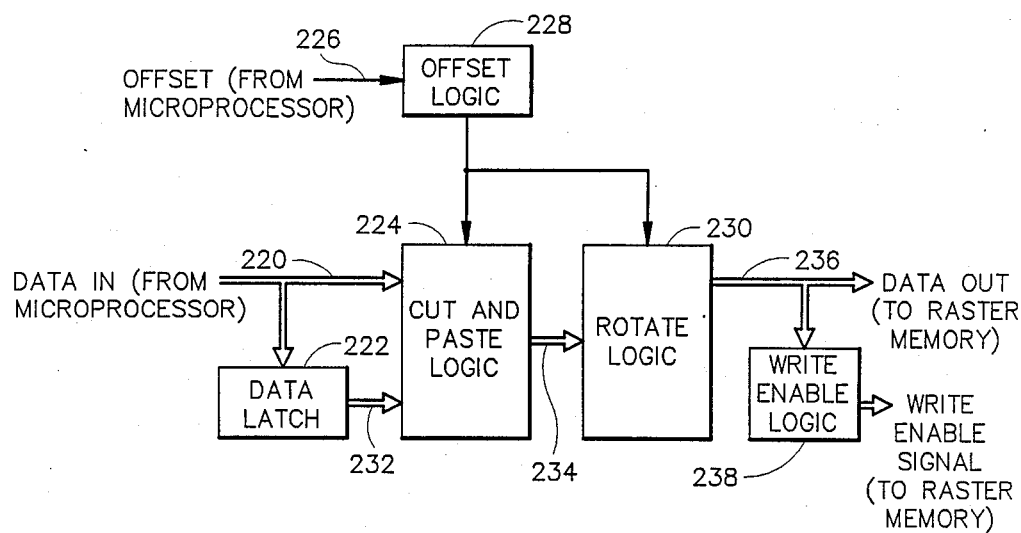
FIG. 4 is a schematical block diagram of the alignment unit.

FIG. 4 illustrates a functional block diagram of the alignment unit 38 of FIG. 1 which aligns and reformats the first orientation data input from the microprocessor of the controller system as output in a second orientation to the raster memory. In FIG. 4, first orientation data is input to the alignment units on bus to 220 from the microprocessor in the controller subsystem. The input data is coupled into first data latch 222 and partitioning or cut and paste logic 224 via bus 220. Offset data is provided from the microprocessor on line 226 to offset logic unit 228. The output from offset logic 228 is input to cut and paste logic 224 and rotate logic 230. The cut and paste logic 224 takes a 16 bit word of old data from a previous operation that is presented from first data latch 222 on bus 232 and a 16 bit word of current data 220 from the current operation. The cut and paste logic defines part of each word depending upon the offset required and provided from offset logic 228 to set the boundary of a new formatted data word which is output from cut and paste logic 224 to rotate logic unit 230 on bus 234. The current word is then held in the first data latch 222 and saved for the next alignment cycle. In effect the paste operation takes the two partial words, portions from a previous and current consecutive font words, and combines them into a new single 16 bit composite data word.

Rotate logic 230 reformats the bit positions within the new composite data word such that the portion of the old data word, least significant bit to most significant bit is provided in the composite word beginning at the least significant bit. The new data portion is provided in the composite data word from least significant bit to most significant bit in continuation from the old data portion. The rotate logic unit 230 provides the rotated composite second orientation data word on bus 236 to the raster memory.

Since raster memory is provided such that each bit position within the rotated composite data word is stored within a different memory unit or chip, it is desired to enable each memory unit such that a particular bit may be written over with only a logical one. This is accomplished by employing a write enable logic which is coupled to bus 236 such that the data presented on bus 236 is written into the raster memory when it is enabled by the same data. For example, in the rotated composite second orientation data word, the most significant bit is presently a logic zero. Since it is logic zero, the write enable logic does not enable the memory unit bit position such that a logic zero remains in the specified bit position. However, in a subsequent second orientation data word the same bit position may be set and its logical one would enable the write enable logic and correspondingly set the bit memory at that particular address location. Correspondingly, should a one be written originally into the bit position and later a logic zero from an overlapping character be attempted to be writ into the same logical bit position, it would not occur because the write enable logic would not enable the memory unit bit position. In effect, data is inclusively ORed when it is to be stored into a bit position memory address.

Figure 5:
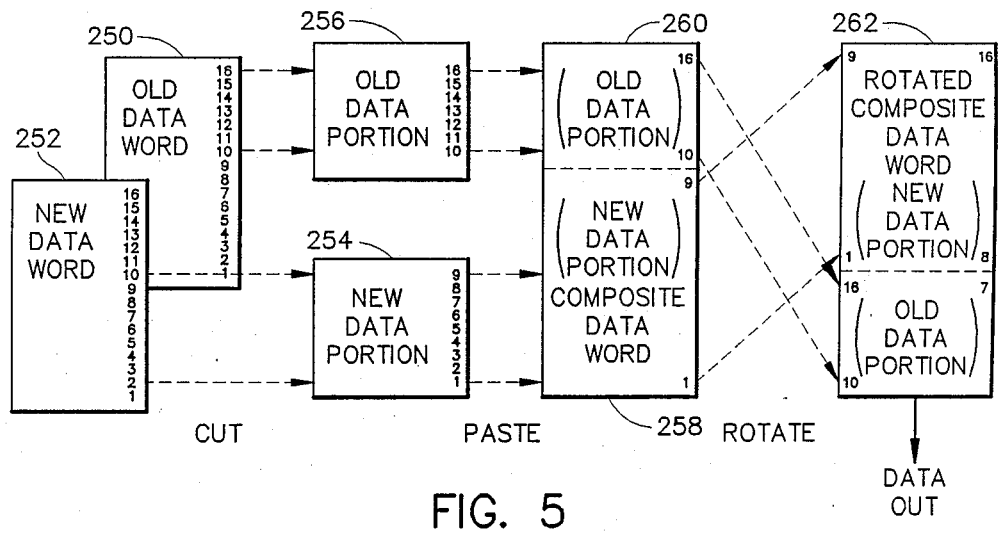
FIG. 5 is a flow chart of the processing of data in the alignment unit.

FIG. 5 illustrates the partitioning or the cutting, pasting and rotating of the data so as to form from an old data word and new data word in the first orientation a rotated composite data word in the second orientation. The old data word 250, for exemplary purposes a 16 bit word in which the 10th through 16th bits were unused in a previous alignment cycle. The entire old data word is held within the first data latch. During a current cycle a new data word 252 is presented to the cut and paste logic along with the entire old data word. The offset logic provides to the cut and paste logic the boundary in the composite data word are to be used from the old data portion and the new data portion. The cut and paste logic combines from the new data word the bits in the 1st through 9th bit position 254 in parallel into the composite data word with the 1st bit position being the least significant bit position up to the 9th bit position in the composite data word 258. The 10th through 16th bit positions as the old data portion 256 are provided in parallel as the 10th through the 16th bit positions in the composite data word 260. The rotate logic translates the old data portion 260 in the composite data word, bits 10th through 16th into positions corresponding to bits 1st through 7th positions in the rotated composite second orientation data word with the 1st bit position being the least significant bit. The 8th through 16th bit positions in the rotated composite data word correspond to the 1st through 9th bit positions in the new data portions 258. The 16th bit position in the rotated composite data word being the most significant bit in the rotated composite data word.

Figure 6:
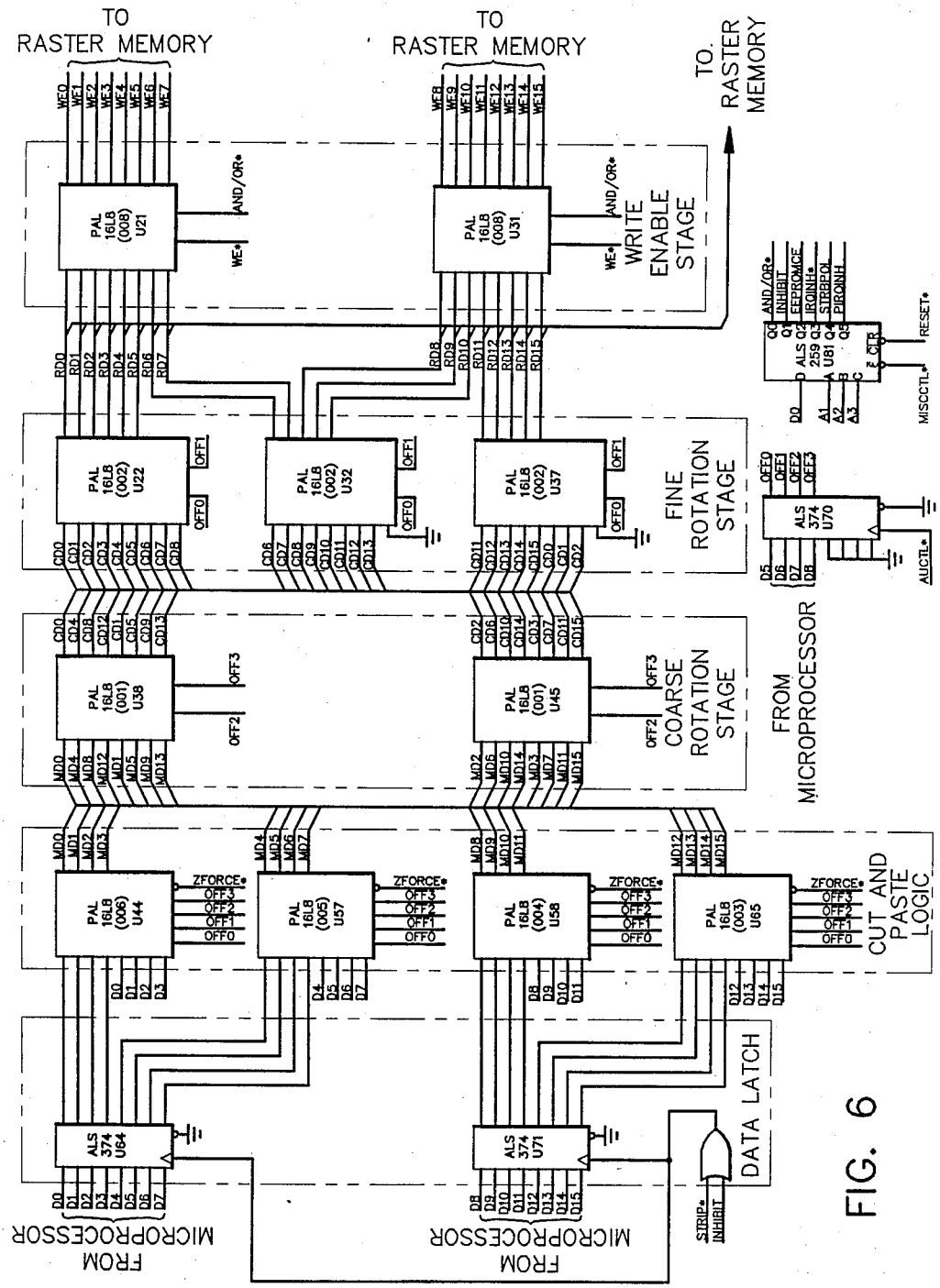
FIG. 6 is a schematical representation of the alignment unit.

FIG. 6 illustrates a schematical diagram of the alignment unit of the present invention. Data from the previous alignment operations are held in the two first data latches U64 and U71 with data provided on the data bus from the microprocessor with 8 bits (D0–D7) being provided to U64 while 8 data bits (D8–D15) are provided to U71. The current data and the previous data are presented to the cut and paste logic implemented by a plurality of programmable array logic units U44,U57-,U58 and U65. The offset controls are provided from U70 in response to 4 bits of data provided from the controller on lines D5–D8 of the data bus. The data is output from the cut and paste logic on a data bus which is coupled to a coarse rotation storage implemented by programmable array logic chips U38 and U45. The data is output from the coarse rotation stage onto a data bus (CD) to the inputs of a fine rotation stage comprised of programmable array logic units U22,U32 and U37. The data output from the fine rotation stage is provided on the data bus (RD) as bits RD0-RD15. The bit appearing at the RD0 line is the least significant bit while the bit appearing the RD15 is the most significant bit in the rotated composite second orientation data word. Each data bit in the rotated composite word is presented in parallel to a separate raster memory unit illustrated in FIG. 7.

Coupled to the RD data bus are a pair of programmable array logic chips U21 and U31. U21 is coupled to lines RD0-RD7 of the RD data bus while U31 is coupled to lines RD8-RD15 of the RD data bus. Chips U21 and U31 provide the write enable signal to the respective ones of the raster memory units. The control signals for the write enable logic stage come from register U81 which is set by a microprocessor under program control.

The program array logic units used for the various elements of the alignment device reflect the specific logical equations necessary for their respective operations. Attached hereto as Tables A through G are the program equations for each of the program array logic elements used in the alignment device. The nomenclature used for each table reflects the nomenclature described on FIG. 6 so that like designations refer to like signals. In the attached figures, the nomenclature "plus" is an inclusive or designation; the nomenclature "*" is the and function; the nomenclature / is the negative function.

Figure 7:
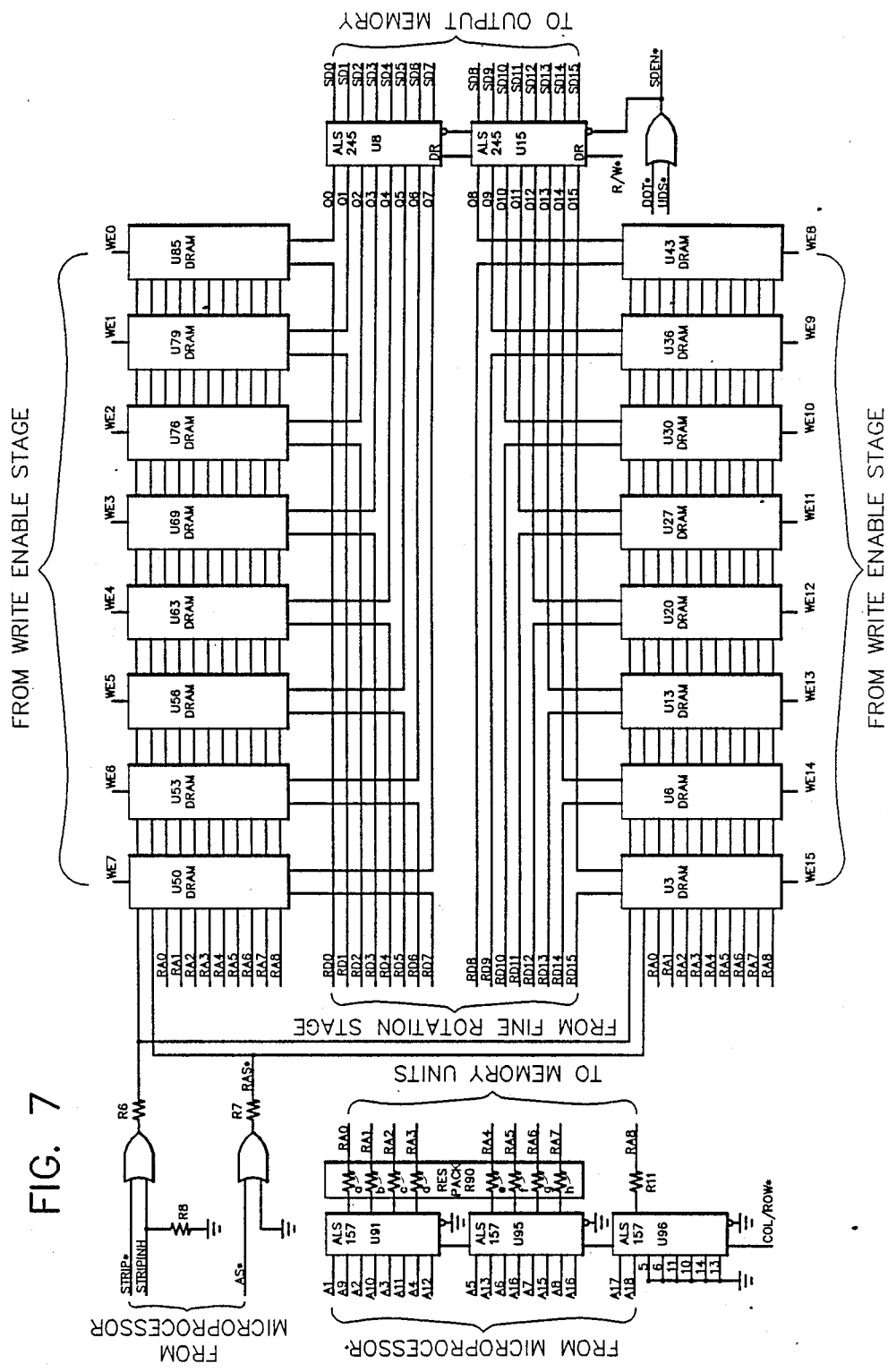
FIG. 7 is a schematical representation of the raster memory including raster memory units and interfacing circuitry.

FIG. 7 illustrates the raster memory configuration and the addressing interface to each memory unit. The address bus of the microprocessor is coupled to chips U91,U95 and U96 which are connected such that a corresponding output is coupled through series coupled resistors R90a-R90h and R11. The address bus RA0--RA8 is coupled to each memory unit comprises of dynamic random access memories U50, U53, U56, U63, U69, U76, U79, U85, U03, U06, U13, U20, U27, U30, U36, and U43. Each memory unit is connected to a different line of the RD data bus. For example, U85 is connected to receive the bits appearing on the RD0 data bus line. In addition each memory unit is also coupled by a write enable signal, from the write enable stage of the alignment unit. For example, memory unit U85 is coupled to the write enable signal WE0 which is correspondingly generated in the write enable stage in response to the data bit on the RD0 line. Each memory unit stores in sequential memory locations the same bit position within sequenced data words. When the same address is presented to all memory units, a complete 16 bit word is generated and provided to a buffer stage comprised of buffers U8 and U15. The word output from the buffer stage is a full 16 bit word corresponding to the rotated composite second oriented data word that was previously stored in that bit position for that memory unit.

TABLE A

PROGRAM EQUATIONS FOR PROGRAMMABLE ARRAY LOGIC COARSE ROTATION (001)

| | |
|---|---|
| CD0 | = /OFF3 * /OFF2 * MD0 |
| | + /OFF3 *  OFF2 * MD4 |
| | +  OFF3 * /OFF2 * MD8 |
| | +  OFF3 *  OFF2 * MD12 |
| CD4 | = /OFF3 * /OFF2 * MD4 |
| | + /OFF3 *  OFF2 * MD8 |
| | +  OFF3 * /OFF2 * MD12 |
| | +  OFF3 *  OFF2 * MD0 |
| CD8 | = /OFF3 * /OFF2 * MD8 |
| | + /OFF3 *  OFF2 * MD12 |
| | +  OFF3 * /OFF2 * MD0 |
| | +  OFF3 *  OFF2 * MD4 |
| CD12 | = /OFF3 * /OFF2 * MD12 |
| | + /OFF3 *  OFF2 * MD0 |
| | +  OFF3 * /OFF2 * MD4 |
| | +  OFF3 *  OFF2 * MD8 |
| CD1 | = /OFF3 * /OFF2 * MD1 |
| | + /OFF3 * /OFF2 * MD5 |
| | +  OFF3 * /OFF2 * MD9 |
| | +  OFF3 *  OFF2 * MD13 |
| CD5 | = /OFF3 * /OFF2 * MD5 |
| | + /OFF3 *  OFF2 * MD9 |
| | +  OFF3 * /OFF2 * MD13 |
| | +  OFF3 *  OFF2 * MD1 |
| CD9 | = /OFF3 * /OFF2 * MD9 |
| | + /OFF3 *  OFF2 * MD13 |
| | +  OFF3 * /OFF2 * MD1 |
| | +  OFF3 *  OFF2 * MD5 |
| CD13 | = /OFF3 * /OFF2 * MD13 |
| | + /OFF3 *  OFF2 * MD1 |
| | +  OFF3 * /OFF2 * MD5 |
| | +  OFF3 *  OFF2 * MD9 |

Copyright © 1984 All rights reserved
Office Automation Systems, Inc.

TABLE B

PROGRAM EQUATIONS FOR PROGRAMMABLE ARRAY LOGIC FINE ROTATION (002)

| | |
|---|---|
| RD0 | = /OFF1 * /OFF0 * CD0 |
| | + /OFF1 *  OFF0 * CD1 |
| | +  OFF1 * /OFF0 * CD2 |
| | +  OFF1 *  OFF0 * CD3 |
| RD1 | = /OFF1 * /OFF0 * CD1 |
| | + /OFF1 *  OFF0 * CD2 |
| | +  OFF1 * /OFF0 * CD3 |
| | +  OFF1 *  OFF0 * CD4 |
| RD2 | = /OFF1 * /OFF0 * CD2 |
| | + /OFF1 *  OFF0 * CD3 |
| | +  OFF1 * /OFF0 * CD4 |
| | +  OFF1 *  OFF0 * CD5 |
| RD3 | = /OFF1 * /OFF0 * CD3 |
| | + /OFF1 *  OFF0 * CD4 |
| | +  OFF1 * /OFF0 * CD5 |
| | +  OFF1 *  OFF0 * CD6 |
| RD4 | = /OFF1 * /OFF0 * CD4 |
| | + /OFF1 *  OFF0 * CD5 |
| | +  OFF1 * /OFF0 * CD6 |
| | +  OFF1 *  OFF0 * CD7 |
| RD5 | = /OFF1 * /OFF0 * CD5 |
| | + /OFF1 *  OFF0 * CD6 |
| | +  OFF1 * /OFF0 * CD7 |
| | +  OFF1 *  OFF0 * CD8 |

Copyright © 1984 All rights reserved
Office Automation Systems, Inc.

TABLE C

PROGRAM EQUATIONS FOR PROGRAMMABLE ARRAY LOGIC
CUT AND PASTE BITS 12-15 (003)

| MD15 | = ZFCE * /OFF3 * /OFF2 * /OFF1 * /OFF0 * | NEW15 | : < 1 NEW |
| --- | --- | --- | --- |
| | + ZFCE *  OFF3 * | OLD15 | : > = 1 OLD |
| | + ZFCE * /OFF3 *  OFF2 * | OLD15 | |
| | + ZFCE * /OFF3 * /OFF2 *  OFF1 * | OLD15 | |
| | + ZFCE * /OFF3 * /OFF2 * /OFF1 *  OFF0 * | OLD15 | |

TABLE C-continued
PROGRAM EQUATIONS FOR PROGRAMMABLE ARRAY LOGIC CUT AND PASTE BITS 12-15 (003)

```
MD14 = ZFCE * /OFF3 * /OFF2 * /OFF1 *           NEW14    : < 2 NEW
     + ZFCE *  OFF3 *                           OLD14    : >= 2 OLD
     + ZFCE * /OFF3 *  OFF2 *                   OLD14
     + ZFCE * /OFF3 * /OFF2 *  OFF1 *           OLD14
MD13 = ZFCE * /OFF3 * /OFF2 * /OFF1 *           NEW13    : < 3 NEW
     + ZFCE * /OFF3 * /OFF2 *  OFF1 * /OFF0 *   NEW13
     + ZFCE *  OFF3 *                           OLD13    : >= 3 OLD
     + ZFCE * /OFF3 *  OFF2 *                   OLD13
     + ZFCE * /OFF3 * /OFF2 *  OFF1 *  OFF0 *   OLD13
MD12 = ZFCE * /OFF3 * /OFF2 *                   NEW12    : < 4 NEW
     + ZFCE *  OFF3 *                           OLD12    : >= 4 OLD
     + ZFCE * /OFF3 *  OFF2 *                   OLD12
NC   = VCC
```

Copyright © 1984 All rights reserved
Office Automation Systems, Inc.

TABLE D
PROGRAM EQUATIONS FOR PROGRAMMABLE ARRAY LOGIC CUT AND PASTE BITS 8-11 (004)

```
MD11 = ZFCE * /OFF3 *  OFF2 * /OFF1 * /OFF0 *   NEW11    : < 5 NEW
     + ZFCE * /OFF3 * /OFF2 *                   NEW11
     + ZFCE *  OFF3 *                           OLD11    : >= 5 OLD
     + ZFCE * /OFF3 *  OFF2 *  OFF1 *           OLD11
     + ZFCE * /OFF3 *  OFF2 * /OFF1 *  OFF0 *   OLD11
MD10 = ZFCE * /OFF3 *  OFF2 * /OFF1 *           NEW10    : < 6 NEW
     + ZFCE * /OFF3 * /OFF2 *                   NEW10
     + ZFCE *  OFF3 *                           OLD10    : >= 6 OLD
     + ZFCE * /OFF3 *  OFF2 *  OFF1 *           OLD10
MD9  = ZFCE * /OFF3 *  OFF2 *  OFF1 * /OFF0 *   NEW9     : < 7 NEW
     + ZFCE * /OFF3 *  OFF2 * /OFF1 *           NEW9
     + ZFCE * /OFF3 * /OFF2 *                   NEW9
     + ZFCE *  OFF3 *                           OLD9     : >=7 OLD
     + ZFCE * /OFF3 *  OFF2 *  OFF1 *  OFF0 *   OLD9
MD8  = ZFCE * /OFF3 *                           NEW8     : < 8 NEW
     + ZFCE *  OFF3 *                           OLD8     : >= 8 OLD
```

Copyright © 1984 All rights reserved
Office Automation Systems, Inc.

TABLE E
PROGRAM EQUATIONS FOR PROGRAMMABLE ARRAY LOGIC CUT AND PASTE BITS 4-7 (005)

```
MD7 = ZFCE *  OFF3 * /OFF2 * /OFF1 * /OFF0 *    NEW7    : < 9 NEW
    + ZFCE * /OFF3 *                            NEW7
    + ZFCE *  OFF3 *  OFF2 *                    OLD7    : >= 9 OLD
    + ZFCE *  OFF3 * /OFF2 *  OFF1 *            OLD7
    + ZFCE *  OFF3 * /OFF2 * /OFF1 *  OFF0      OLD7
MD6 = ZFCE *  OFF3 * /OFF2 * /OFF1 *            NEW6    : < 10 NEW
    + ZFCE * /OFF3 *                            NEW6
    + ZFCE *  OFF3 *  OFF2 *                    OLD6    : >= 10 OLD
    + ZFCE *  OFF3 * /OFF2 *  OFF1 *            OLD6
MD5 = ZFCE *  OFF3 * /OFF2 *  OFF1 * /OFF0 *    NEW5    : < 11 NEW
    + ZFCE *  OFF3 * /OFF2 * /OFF1 *            NEW5
    + ZFCE * /OFF3 *                            NEW5
    + ZFCE *  OFF3 *  OFF2 *                    OLD5    : >= 11 OLD
    + ZFCE *  OFF3 * /OFF2 *  OFF1 *  OFF0 *    OLD5
MD4 = ZFCE *  OFF3 * /OFF2 *                    NEW4    : < 12 NEW
    + ZFCE * /OFF3 *                            NEW4
    + ZFCE *  OFF3 *  OFF2 *                    OLD4    : >= 12 OLD
```

Copyright © 1984 All rights reserved
Office Automation Systems, Inc.

TABLE F
PROGRAM EQUATIONS FOR PROGRAMMABLE ARRAY LOGIC CUT AND PASTE BITS 0-3 (006)

```
MD3 = ZFCE *  OFF3 *  OFF2 * /OFF1 * /OFF0 *    NEW3    : < 13 NEW
    + ZFCE *  OFF3 * /OFF2 *                    NEW3
    + ZFCE * /OFF3 *                            NEW3
    + ZFCE *  OFF3 *  OFF2 *  OFF1 *            OLD3    : >= 13 OLD
    + ZFCE *  OFF3 *  OFF2 * /OFF1 *  OFF0 *    OLD3
MD2 = ZFCE *  OFF3 *  OFF2 * /OFF1 *            NEW2    : < 14 NEW
    + ZFCE *  OFF3 * /OFF2 *                    NEW2
    + ZFCE * /OFF3 *                            NEW2
    + ZFCE *  OFF3 *  OFF2 *  OFF1 *            OLD2    : >= 14 OLD
```

TABLE F-continued
PROGRAM EQUATIONS FOR PROGRAMMABLE ARRAY LOGIC CUT AND PASTE BITS 0–3 (006)

```
MD1 = ZFCE * OFF3 * OFF2 * OFF1 * /OFF0 *  NEW1   : < 15 NEW
    + ZFCE * OFF3 * OFF2 * /OFF1 *         NEW1
    + ZFCE * OFF3 * /OFF2 *                NEW1
    + ZFCE * /OFF3 *                       NEW1
    + ZFCE * OFF3 * OFF2 * OFF1 * OFF0 *   OLD1   : > = 15 OLD
MD0 = ZFCE *                               NEW0   : ALWAYS NEW
```

Copyright © 1984 All rights reserved
Office Automation Systems, Inc.

TABLE G
PROGRAM EQUATIONS FOR PROGRAMMABLE ARRAY LOGIC WRITE ENABLE (008)

```
WE0    = AND * WE * /RD0
       + /AND * WE *  RD0
WE1    = AND * WE * /RD1
       + /AND * WE *  RD1
WE2    = AND * WE * /RD2
       + /AND * WE *  RD2
WE3    = AND * WE * /RD3
       + /AND * WE *  RD3
WE4    = AND * WE * /RD4
       + /AND * WE *  RD4
WE5    = AND * WE * /RD5
       + /AND * WE *  RD5
WE6    = AND * WE * /RD6
       + /AND * WE *  RD6
WE7    = AND * WE * /RD7
       + /AND * WE *  RD7
```

Copyright © 1984 All rights reserved
Office Automation Systmes Inc.

The raster memory is constructed such that a partial window is formulated having a 256 dot line height by 4096 bit wide. Although described as being a 256 dot line high window, it is envisioned that a full page bit map memory implementation is also within the scope of this invention.

During the retrace period of the print engine, the controller system causes the next dot line to be transferred from the raster memory to the output memory. As the next dot line is read out of the raster memory, the raster memory is cleared to all zeros. By conventional pointer means within the controller system, the top of the page is advanced to the next dot line and the dot line just transferred is added to the bottom of the raster memory and ready to accept new print data.

Figure 8:
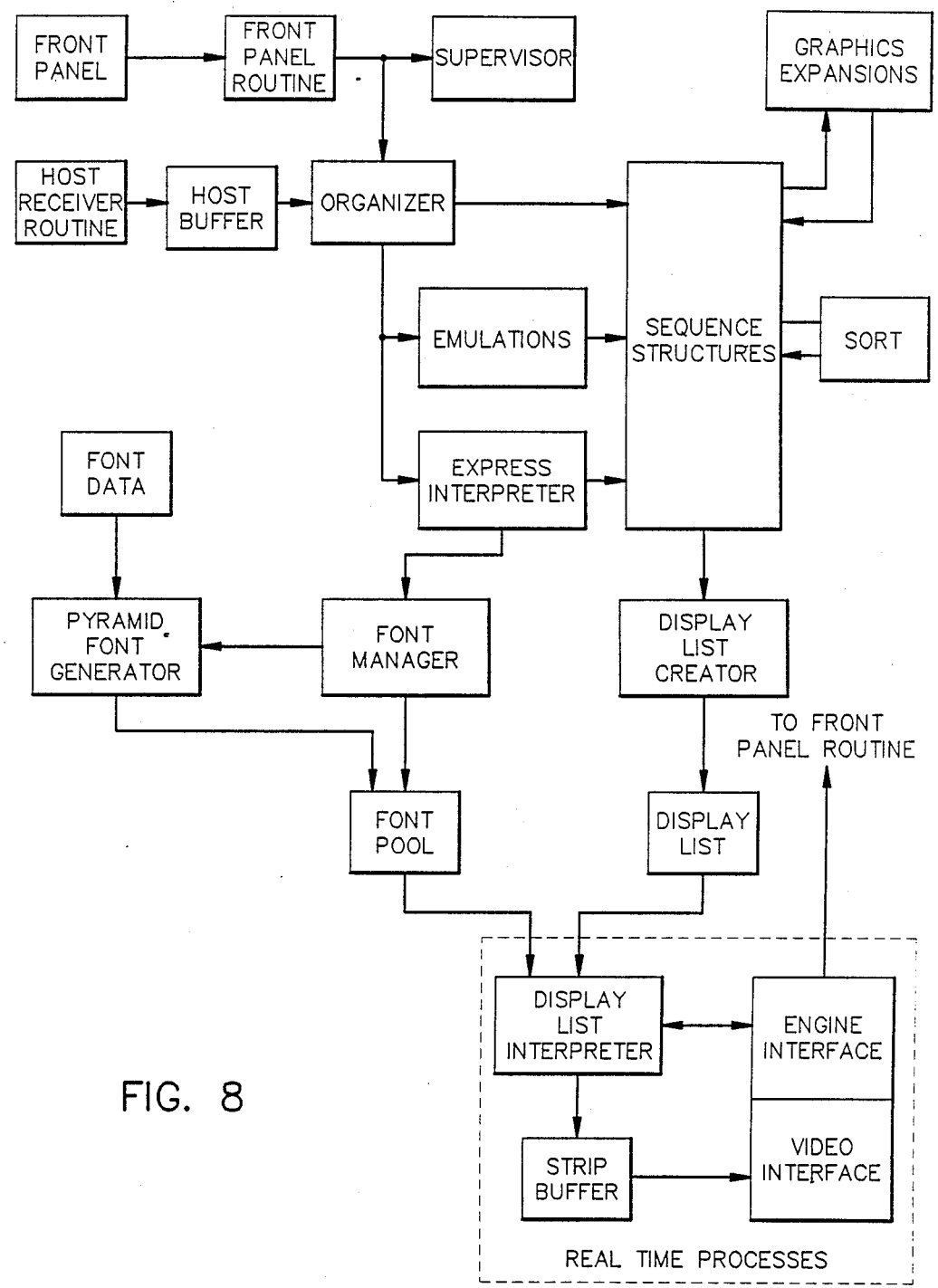
FIG. 8 is a block diagram of the major component of the controller program.

FIG. 8 is a block diagram of the controller program of the controller system. This figure describes a high level view of the program and their interrelationship.

SUPERVISOR: The supervisor coordinates the several processes which operate as co-processes. The two main processes are ORGANIZER and the INTERPRETER. Since the interpreter is a real-time process, it has wait periods which are utilized by the organizer, if it requires service.

ORGANIZOR: Basically, the organizer will have control until a page is printed. At this point, the supervisor initiates the graphics expansions and the data sort. After the data sort is complete, the display list creator is started, and a display list generated. With a complete display list ready to go, the display list interpreter begins. During wait periods, the organizer is again served; up to two pages may be in process at one time.

FRONT PANEL: Allows the user to monitor the power-on configuration and abort a job, as well as determine the status of the printer.

FRONT PANEL ROUTINE: Monitors inputs from the user via the front panel and status inputs from the print engine. The front panel routine is interrupt driven: it is updated according to a real-time clock on board the controller unit. This routine informs the display list supervisor and organizer of the engine status.

HOST RECEIVER ROUTINE: The host receiver routine handles serial or parallel protocol on an interrupt driven basis. The data is placed into the host buffer or data memory until the upper threshold is reached. At this point, the controller indicates that it is busy to the host. The controller continues the busy status until the host buffer drops below the lower threshold.

HOST BUFFER: The host buffer or data memory is a ring buffer to store recieved data from the host.

ORGANIZER: The organizer gets bytes from the host buffer or data memory as input, and generates sequence structures as output. If the character is a valid escape sequence, the organizer will transfer control to either the EXPRESS interpreter, or a device specific emulation.

EMULATIONS: The various emulations will interpret valid escape sequences as printer configuration commands. For example, set right margin is a typical escape sequence configuration command. The intention of the emulations is to allow the printer controller to perform just like the printer being emulated.

EXPRESS INTERPRETER: The EXPRESS interpreter performs all of the functions of the various emulations in a mnemonic driven format unique to the controller. Using EXPRESS, the user is able to use any word process to establish the controller configuration and send it various commands during the course of the printing session. In addition, EXPRESS allows the user to access the functions of the front manager to download or generate additional fonts.

FONT MANAGER: The font manager allows the user to download, generate, delete and rename fonts in the font pool.

FONT POOL: The font pool or font memory is the collection of dot-by-dot character patterns available to the display list interpreter in the correct format for real-time processing.

PYRAMID FONT GENERATOR: The pyramid fonts are fonts which are generated from a basic mathematical description following an algorithmic scheme. These fonts are generated directly into the font pool.

SEQUENCE STRUCTURES: The sequence structures are a linked list of structures usually containing text data. Start location, font used, character spacing, and any special word processing modes are carried in the head of each structure, as well as the count of data bytes in the body of each structure.

GRAPHICS EXPANSIONS: The form of the graphics structures is commonly a compressed version of the structures actually used. For example, basis graphic designs may be generated.

After the basic expansions are performed, each graphics structure may need to be split up into several structures so that each graphics structure is smaller than the vertical width of the raster memory window, which is about 10% of the page height. Therefore, a vertical line must be split into about 10 smaller vertical lines, each of which can be placed in the raster memory window in its entirety.

SORT: The sequence of characters are then sorted according to their vertical position on the page. This is in preparation for the display list creation step.

DISPLAY LIST CREATOR: The display list is created by first setting initial conditions in the display list, and host supply data required to modify these conditions as required as the page is scanned. The structures are scanned character by character to determine which character is first. This is due to the variation in character widths which is the case in proportionally spaced fonts. When all structures have been completed, the termination control sequence is added to the end of the list, and control is passed to the display list interpreter.

DISPLAY LIST: The display list itself is basically a list of control sequences followed by test or graphics data. The order of the list is in the order that the real-time routines require the information, as the page passes through the print engine. The bulk of the list will be a wait for dot line command, followed by the number of the dot line to wait for, followed by a command to set up the raster memory address. Then the text data follows. This arrangement of data repeats until the end of the text data is reached. Graphics structures follow varying formats depending upon the needs of the interpreter routine.

DISPLAY LIST INTERPRETER: The display list interpreter uses the display list to direct real-time processing of the page. When the interpreter is initially entered, the print engine is directed to begin printing a page. During the time when the paper is being picked out of the input dot line, and the mechanical mechanism of the printer is started, the interpter will notify the supervisor of the pause, and the supervisor will transfer control to the organizer as needed. After a wait interval, the a signal occurs which indicates that the beginning of the first page has been reached. At this point the display list will initiate a wait for a particular dot line, for the next line of text. The current dot line is controlled by the engine interface and an interrupt driven routine which transfers one dot line of the raster memory to the output memory. Each time a dot line is transferred, the position of the dot line will 'roll' to the next position on the page. In other words, the transferred dot line will be used as the next, so far unmapped, dot line on the page. This will increment the current dot row position.

When an entire character can be placed in the raster memory, then control is transferred to transfer routines to transfer the dot-by-dot character pattern from the font memory to the raster memory.

RASTER MEMORY: The raster memory is an area of memory where page bit map imaging occurs. To reduce hardware costs, only a portion of the page is imaged at one time. The address space for the strip is redundantly addressed so as to create a ring structure which will repeat at addresses higher than the last physical address. The net result is a virtual space equivalent a full page bit map, but an actual area much smaller than that.

VIDEO INTERFACE: The video interface is driven by the data rate of the engine. Before each dot line can be sent to the printer, it is transferred to the output memory via an end-of-line interrupt. This interrupts any process and moves a full dot line from the raster memory to the output buffer. After the transfer, the data is clocked out serially as the printer scans the line. When all the data has been transferred, the end-of-line interrupt again occurs, and the process repeats.

ENGINE INTERFACE: The engine interface not only allows the interpreter process to start and stop the engine, but also allows the front panel routine to monitor the status of the printer, including jams and paper out conditions.

Figure 9A:
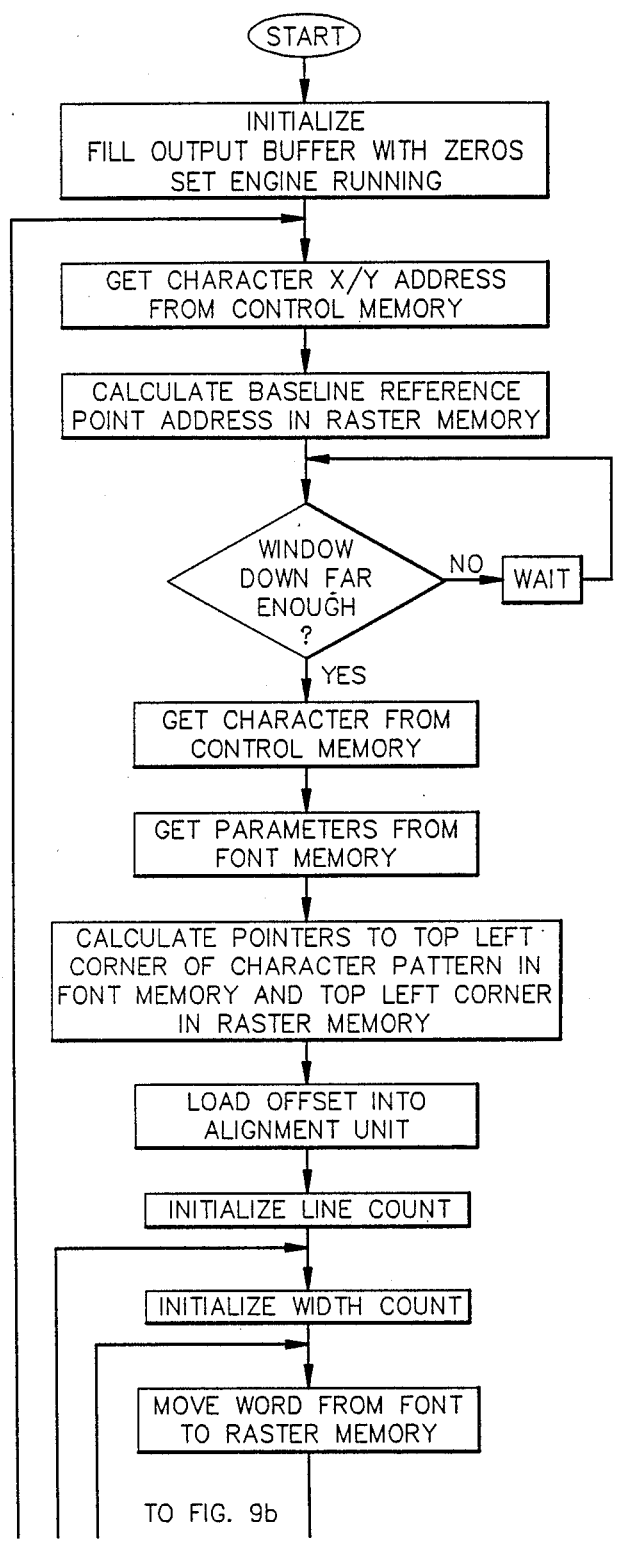
FIG. 9 is a functional flow diagram of the controller program alignment operations within the controller subsystem.

FIG. 9 is a functional flow diagram of the controller program alignment operations within the controller subsystem as part of the display list interpreter of FIG. 8. Specifically, this flow diagram describes the sequence of operations which the controller subsystem effects to operate the alignment device. As is indicated, the operation includes the initialization of environmental data such filling the output memory with all zeros and initializing the print engine. Next, an ASCII character and its location are retrieved from a control memory. The base line reference of the raster memory is calculated to determine its reference point. The character is retrieved front control memory and correlated with the character pattern from the font memory.

The program then calculates pointers to the top left corner of the character pattern in the font memory in the top left corner of the raster memory to determine the offset. The offset is loaded into the alignment unit. The line count is initialized then the width count is initialized. The control program then moves a word from the font memory to the raster memory through the alignment unit and decrements the width count, repeating this operation until the dot line is done. Upon completion of the dot line, the line count is decremented and software returns to reinitialize the width count to transfer the next dot line. If all lines in the character have been completed, the system checks for more characters. If more characters are required, the system returns to get the XY address of the new character from control memory. If all characters are complete, the control program waits until all dot lines have been transferred from the raster memory to the output memory, then exits this routine.

The previous description of the preferred embodiments are provided to enable any person skilled in the art to make or use the present invention. Various modification to these embodiments will be readily apparent to those skilled in the art, and the generic principals defined herein may be applied to other embodiments without the use of the inventive faculty. Thus, the present invention is not intended to be limited to the embodiment shown herein, but is to be accorded the widest scope consistent with the principals and novel features disclosed herein.

What we claim is:

1. A laser printer controller for interfacing a host computer system with a laser print engine comprising:
processor means responsive to user inputs, controller program instructions and system control signals for providing data calculations, memory storage addressing and operational control signals;
control memory means for storing a display list of certain character representations selected from a predetermined set of character representations and their respective locations for a page of data to be printed;

font memory means for storing a dot-by-dot character pattern corresponding to each character representation of said predetermined set of character representations;

output memory and logic means for holding a dot line of data to be printed and for controlling the serial transmission of the data in each dot line to a laser print engine for printing thereby;

raster memory means for receiving and storing a partial page bit map of the page of data to be printed, said partial page bit map providing sequential dot lines of data for transfer to the output memory and logic means, said raster memory means having means for clearing the dot line just transferred to the output memory means and logic means, and scroll means for appending the just cleared dot line to the bottom of the partial page bit map; and alignment device means responsive to said processor means for accepting data words containing the dot-by-dot character patterns in a first word orientation associated with said certain character representations from the control memory means, and for generating and storing data words in a second orientation having bit representations of print data in the partial page bit map for transfer to said raster memory means, said alignment device means including means for aligning the data words of the first word orientation with the data words of a second orientation as required by fixed storage boundaries of the partial page bit map in the raster memory means and means for inclusively ORing the aligned second word orientation in the partial page bit map of the raster memory.

2. The laser printer controller of claim 1 wherein said ORing means includes a write enable storage device for holding the data word in the second orientation and coupling means for using its bit configuration as the write enable for the write operation of the said data word into the raster memory means.

3. The laser printer controller of claim 1 wherein said raster memory means includes memory units comprised of direct random access memory elements wherein each memory unit is coupled to a different bit of said second oriented data word and each memory unit is connected in parallel to a memory addressing means.

4. The laser printer controller of claim 1 wherein said scroll means of said raster memory means includes first pointer means to identify the next dot line to be transferred to the output memory and logic means and second pointer means to indicate the bottom of the partial page bit map.

5. A laser printer controller of claim 1 wherein said processor means includes means for sorting the display list of character representations in their respective location sequentially across then down page of data to be printed.

6. The laser printer controller of claim 1 wherein said processor means includes means for sequentially pairing each character is the display list of character representations with their respective character patterns for sequential transfer to the alignment device means, alignment means for aligning said sequential character patterns of the first word orientation into the second word oriented data words and sorting means for storing said second word orientation data words in the page bit map of the raster memory means.

7. The laser printer controller of claim 6 wherein each of said character patterns is a first array of first word oriented data words, said first array of said data words having at least one data word across to form a character dot line and at least one character dot line long, each bit on said dot line representing a dot in said character pattern.

8. The laser printer controller of claim 1 wherein said processor means includes offset means for computing the number of offset bits that the character pattern of the first word orientation must be write shifted for alignment with the second word orientation of the partial page bit map of the raster memory means.

9. The laser printer controller of claim 8 wherein said alignment device means includes first latching means to save the contents of an old data word, said old data word being the data word of the character pattern in its first orientation, means for presenting a new data word and the old data word to a reformating transfer storage element means, said reformating means for reformating said old data word and said new data word such that a number of bits in the old data word equal to the offset value and located in the most significant data bit positions are stored in sequential order into the least significant data bit positions of a reformated composite data word in the second word orientation and the least significant data bit positions, the number of least significant data bit positions being equal to the difference between the word length and the offset value, are stored in sequential order into the most significant data bit positions of the reformatted composite data word.

10. The laser printer controller system of claim 9 wherein said old data word is all zeros if said new data word is the first word of the dot line of the character pattern and wherein said new data word is all zeros if said old data word is the last word of the dot line of the character pattern.

11. The laser printer controller of claim 10 wherein said reformating means includes partitioning means for holding the most significant data bits of the old data word in an intermediate element with the most significant bits of the old data word in the most significant bit positions of the intermediate element and the least significant data bits of the new data word in said intermediate element with the least significant bits of the new data word in the least significant bit positions of the intermediate element whereby an intermediate full word is stored and rotate means for translating the bit sequence of the bits of the old data word from the most significant bit positions to the least significant bit positions and substantially simultaneously the bit sequence of the bits from the new data word from the least significant bit positions to the most significant bit positions for the composite data word in the second orientation for the storage in the page bit map of the raster memory means.

12. In a laser printer controller, an alignment device for converting a series of input data words each in a first word orientation into a series of output data words, each in a second word orientation comprising:

latch means for receiving a first input data word of a first word orientation and holding for a predetermined period the output of the first input data word; and cut and paste logic means coupled to said latch means for receiving, from said latch means, the output of the first data word and for receiving a current data word, said cut and paste logic means combining a portion of said first data word with a portion of said current data word in a predetermined sequence so as to provide an output data word of a second word orientation.

13. The device of claim 12 further comprising offset logic means for providing a control signal to said cut and paste logic means, said control signal establishing the size of each of said first word portion and said current word portion in said output data word.

14. The device of claim 12 further comprising rotate logic means coupled to said cut and paste logic means for receiving said output word and rotating the position of said first word portion with said current word portion for providing said output word.

15. The device of claim 12 further comprising offset logic means for providing a control signal to said cut and paste logic means, said control signal establishing the size of each of said first word portion and said second word portion in said output data word, and rotate logic means coupled to said cut and paste logic means for receiving said output data word and rotating the position of said first word portion with said current word portion for providing said output word.

16. A method for converting a series of input data words each in a first word orientation into a series of output data words each in a second word orientation;
 receiving an input data word;
 holding said input data word for a predetermined period of time as a delayed data word;
 receiving a next following data word as a current data word;
 combining a portion of said delayed data word with a portion of said current data word in a predetermined sequence; and
 providing said sequenced portions of said delayed data word and said current data word as an output data word in a second word orientation.

* * * * *